(12) United States Patent
Arima et al.

(10) Patent No.: US 9,264,096 B2
(45) Date of Patent: Feb. 16, 2016

(54) RECEIVER

(71) Applicant: Sony Corporation, Tokyo (JP)

(72) Inventors: Daisuke Arima, Fukuoka (JP);
Masayuki Katakura, Kanagawa (JP);
Katsuyuki Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 61 days.

(21) Appl. No.: 13/906,383

(22) Filed: May 31, 2013

(65) Prior Publication Data

US 2013/0336368 A1  Dec. 19, 2013

(30) Foreign Application Priority Data

Jun. 14, 2012  (JP) ................................. 2012-134335

(51) Int. Cl.
| | |
|---|---|
| H04B 1/26 | (2006.01) |
| H04B 1/7097 | (2011.01) |
| G01S 19/13 | (2010.01) |
| G01S 19/34 | (2010.01) |
| G01S 19/37 | (2010.01) |

(52) U.S. Cl.
CPC .............. *H04B 1/7097* (2013.01); *G01S 19/13* (2013.01); *G01S 19/34* (2013.01); *G01S 19/37* (2013.01)

(58) Field of Classification Search
CPC ......... G01S 19/13; G01S 19/34; G01S 19/37; G01S 5/02; G01S 5/14; G01S 19/33; G01S 19/36; G01S 19/48; H04B 1/02; H04B 1/16; H04B 1/18; H04B 1/26; H04B 1/7097; H04B 1/10; H04B 1/185; H04B 1/713; G01B 11/02; H04L 7/00; H04L 27/06

USPC ......... 375/144, 241, 316, 136, 340, 356, 371; 455/77, 86, 87, 102, 114.1, 182.1, 205, 455/315, 333, 161.1, 302; 342/352, 357.06, 342/357.12, 357.31, 357.73, 357.76, 342/357.77; 370/316; 701/213
See application file for complete search history.

(56) References Cited

U.S. PATENT DOCUMENTS

| | | | | |
|---|---|---|---|---|
| 5,541,606 A | * | 7/1996 | Lennen ................... | G01S 19/32 342/352 |
| 5,606,736 A | * | 2/1997 | Hasler et al. .................. | 455/314 |
| 5,678,169 A | | 10/1997 | Turney | |

(Continued)

FOREIGN PATENT DOCUMENTS

| | | |
|---|---|---|
| JP | 07-128423 A | 5/1995 |
| JP | 10-290212 A | 10/1998 |

(Continued)

*Primary Examiner* — Sam K Ahn
*Assistant Examiner* — Shawkat M Ali
(74) *Attorney, Agent, or Firm* — Michael Best & Friedrich LLP (57) ABSTRACT

Disclosed herein is a receiver including: a first mixer adapted to mix satellite signals from first and second satellites and a first local oscillation signal so as to convert a carrier frequency of the satellite signals into a lower first intermediate frequency; a second mixer adapted to mix a satellite signal of the second satellite frequency-converted by the first mixer and a second local oscillation signal so as to convert the first intermediate frequency of the frequency-converted satellite signal from the second satellite into an even lower second intermediate frequency; and a first frequency divider adapted to generate the second local oscillation signal by dividing a frequency of the first local oscillation signal.

20 Claims, 7 Drawing Sheets

(56) References Cited

U.S. PATENT DOCUMENTS

| | | | |
|---|---|---|---|
| 5,923,287 A * | 7/1999 | Lennen | G01S 19/33 342/357.73 |
| 6,441,780 B1 * | 8/2002 | Rog et al. | 342/357.61 |
| 8,018,379 B1 * | 9/2011 | Sun | G01S 19/33 342/357.73 |
| 8,139,161 B2 * | 3/2012 | Birleson et al. | 348/731 |
| 2006/0121864 A1 * | 6/2006 | Rodgers et al. | 455/182.1 |
| 2007/0096980 A1 * | 5/2007 | Gradincic | G01S 19/32 342/357.72 |
| 2010/0265875 A1 * | 10/2010 | Zhao | H04B 1/0007 370/316 |
| 2010/0302100 A1 * | 12/2010 | Yang | G01S 19/36 342/357.73 |
| 2011/0181468 A1 * | 7/2011 | Sun | G01S 19/30 342/357.73 |
| 2011/0215967 A1 * | 9/2011 | Suzuki | G01S 19/29 342/357.31 |
| 2012/0007777 A1 * | 1/2012 | Hammes | G01S 19/33 342/357.73 |
| 2012/0026039 A1 * | 2/2012 | Ganeshan | G01S 19/33 342/357.73 |
| 2012/0177161 A1 * | 7/2012 | Husted | G01S 19/235 375/371 |
| 2013/0136154 A1 * | 5/2013 | Chomal | H04B 1/7075 375/136 |

FOREIGN PATENT DOCUMENTS

| | | |
|---|---|---|
| JP | 2002-533684 A | 10/2002 |
| JP | 2003-289262 A | 10/2003 |
| JP | 2009-092473 A | 4/2009 |

* cited by examiner

RECEIVER

BACKGROUND

The present technology relates to a receiver configured to receive a satellite signal, and more particularly, to a receiver configured to receive satellite signals from different types of satellites.

GPS, Galileo and GLONASS are known as positioning systems adapted to find the position and speed of a mobile using a positioning signal transmitted from a satellite. GPS (Global Positioning System) was developed in the United States and has found application for aviation and marine navigation and as a car navigation system. Galileo is a positioning system developed primarily in the European Union (EU). GLONASS (GLObal NAvigation Satellite System) is a positioning system developed in Russia. Although differing in pseudo noise in spread spectrum modulation of a positioning signal, GPS and Galileo use the same positioning principle and calculations. Further, the two systems are the same in terms of the center frequency of the carrier frequency in a specific frequency band. On the other hand, GLONASS differs from GPS and Galileo in terms of the center frequency of the carrier frequency.

A receiver has been proposed in related art that is designed to receive positioning signals from a plurality of types of satellites of all the positioning systems described above. For example, a receiver has been proposed that can receive GPS and GLONASS positioning signals. This is accomplished by setting a first local oscillation frequency intermediate between the GPS and GLONASS reception frequencies and using an image removal mixer (refer, for example, to Japanese Patent Laid-open No. Hei 07-128423). Further, another receiver has been proposed that is designed to generate intermediate frequencies for a plurality of satellites through a single down-conversion process (refer, for example, to Japanese Patent Laid-open No. 2009-092473). This is accomplished by setting different first mixer frequencies for two reception signals.

SUMMARY

In the above related art, GPS and GLONASS positioning signals can be received by a single receiver. However, setting a first local oscillation frequency intermediate between the GPS and GLONASS reception frequencies leads to higher power consumption due to a higher first mixer output frequency. Setting different first mixer frequencies for two reception signals results in higher power consumption because it is necessary to generate a frequency that is the lowest common multiple of the local oscillation frequency of the first mixer.

The present technology has been devised in light of the foregoing, and it is desirable to contribute to reduced power consumption of a receiver adapted to receive positioning signals from a plurality of satellites.

A first mode of the present technology is a receiver that includes first and second mixers and a first frequency divider. The first mixer mixes satellite signals from first and second satellites and a first local oscillation signal, thus converting a carrier frequency of the satellite signals into a lower first intermediate frequency. The second mixer mixes a satellite signal of the second satellite frequency-converted by the first mixer and a second local oscillation signal, thus converting the first intermediate frequency of the frequency-converted satellite signal from the second satellite into an even lower second intermediate frequency. The first frequency divider generates the second local oscillation signal by dividing the frequency of the first local oscillation signal in such a manner that, of harmonic components of the second local oscillation signal, a harmonic component one higher in order than that equal to the first local oscillation signal frequency falls within a carrier frequency band of the satellite signal from the second satellite. This contributes to reduced power consumption of the receiver adapted to receive satellite signals from the first and second satellites while at the same time preventing adverse impacts of the harmonics on the reception capability.

In the first mode, the first frequency divider may have a frequency division ratio identical to the order of the harmonic component, of the harmonic components of the second local oscillation signal, that is equal in frequency to the first local oscillation signal. This contributes to reduced power consumption by setting the first intermediate frequency of the satellite signal from the first satellite to a low or zero frequency.

In the first mode, the receiver may further include a filter adapted to remove direct-current components from the satellite signal from the second satellite that has been converted into the second intermediate frequency. This prevents degradation of the reception capability in the frequency band of the second satellite.

It should be noted that, in the first mode, the first satellite is assumably a GPS or Galileo satellite and the second satellite is assumably a GLONASS satellite. In this case, a carrier frequency band of the first satellite is from 1573.374 to 1577.466 MHz, and that of the second satellite is from 1597.5515 to 1605.886 MHz. At this time, the first local oscillation signal frequency can be 1573.000 MHz, and the frequency division ratio of the first frequency divider can be 56. Further, the first local oscillation signal frequency can be 1571.328 MHz, and the frequency division ratio of the first frequency divider can be 52.

In the first mode, the receiver may still further include a second frequency divider adapted to generate a system clock by dividing the first local oscillation signal frequency in such a manner that a harmonic component of the system clock falls outside carrier frequency bands of the satellite signals of the first and second satellites. This prevents adverse impacts of the harmonics of the system clock on the reception capability. Here, the system clock is assumably supplied to at least one of a baseband signal processing circuit or a logic circuit including a processor, an analog-digital converter adapted to convert an analog signal into a digital signal, and a converter adapted to convert a given direct-current voltage into an other direct-current voltage.

It should be noted that, in the first mode, the first satellite is assumably a GPS or Galileo satellite and the second satellite is assumably a GLONASS satellite. In this case, the carrier frequency band of the first satellite is from 1573.374 to 1577.466 MHz, and that of the second satellite is from 1597.5515 to 1605.886 MHz. At this time, the first local oscillation signal frequency can be 1573.000 MHz, and a frequency division ratio of the first frequency divider can be 56. A frequency division ratio of the second frequency divider adapted to generate the system clock supplied to the logic circuit can be 11, 22 or 44, that adapted to generate the system clock supplied to the analog-digital converter can be 44, and that adapted to generate the system clock supplied to the converter that converts a given direct-current voltage into another direct-current voltage can be 132. Further, the first local oscillation signal frequency can be 1571.328 MHz, and a frequency division ratio of the first frequency divider can be 52. In the second frequency divider, a frequency division ratio adapted to generate the system clock supplied to the converter that converts a given direct-current voltage into an other direct-current voltage can be 128.

A second mode of the present technology is a receiver that includes first and second mixers and a first frequency divider. The first mixer mixes satellite signals from first and second satellites and a first local oscillation signal, thus converting a carrier frequency of the satellite signals into a lower first intermediate frequency. The second mixer mixes a satellite signal of the second satellite frequency-converted by the first mixer and a second local oscillation signal, thus converting the first intermediate frequency of the frequency-converted satellite signal from the second satellite into an even lower second intermediate frequency. The first frequency divider generates the second local oscillation signal by dividing the frequency of the first local oscillation signal. Letting the first local oscillation signal frequency be denoted by $f_{lo1}$ and a frequency division ratio of the first frequency divider by $N_2$, an inequality 1597.5515 MHz$<f_{lo1}/N_2\times(N_X+1)<$1605.886 MHz is satisfied where $N_X$ is a maximum number of a natural number N that satisfies an inequality $f_{lo1}/N_2\times N<$1573.374 MHz. This contributes to reduced power consumption of the receiver adapted to receive satellite signals from a GPS or Galileo satellite and a GLONASS satellite while at the same time preventing adverse impacts of the harmonics on the reception capability.

The present technology is highly advantageous in that the power consumption of a receiver adapted to receive positioning signals from a plurality of types of satellites can be reduced.

DETAILED DESCRIPTION OF THE PREFERRED EMBODIMENTS

A description will be given below of modes for carrying out the present technology (hereinafter referred to as embodiments). The description will be given in the following order.
1. First Embodiment (example in which a local oscillation signal is supplied to a second mixer)
2. Second Embodiment (example in which a system clock is further supplied)

1. First Embodiment

[Configuration of Receiver]

Figure 1:
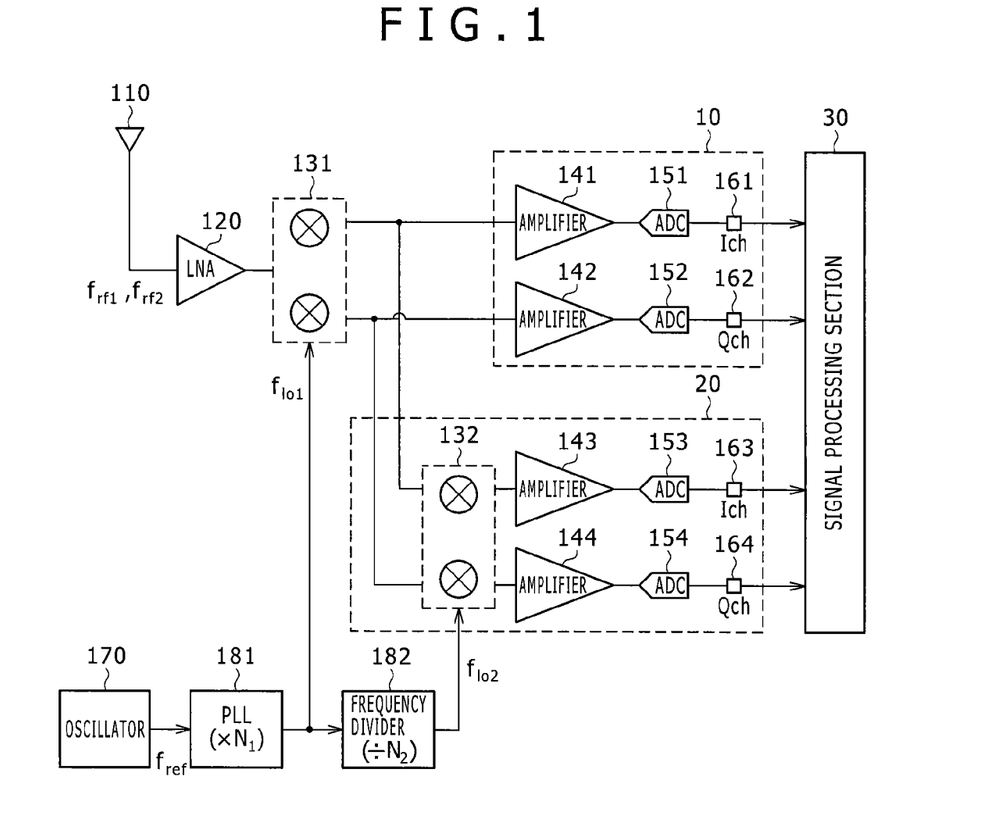
FIG. 1 is a diagram illustrating a configuration example of a receiver according to a first embodiment of the present technology.

FIG. 1 is a diagram illustrating a configuration example of a receiver according to a first embodiment of the present technology. This receiver includes an antenna 110, a low noise amplification circuit 120, first and second mixers 131 and 132, amplifiers 141 to 144, analog-digital converters 151 to 154, an oscillator 170, a PLL 181 and a frequency divider 182. The receiver also includes a signal processing section 30 as a processing circuit provided at a subsequent stage.

The amplifiers 141 and 142 and analog-digital converters 151 and 152 serve as a GPS/Galileo reception section 10. The same section 10 is a circuit designed to receive a GPS signal, i.e., a satellite signal transmitted from a GPS satellite, and a Galileo signal, i.e., a satellite signal transmitted from a Galileo satellite.

The amplifiers 143 and 144 and analog-digital converters 153 and 154 serve as a GLONASS reception section 20. The same section 20 is a circuit designed to receive a GLONASS signal, i.e., a satellite signal transmitted from a GLONASS satellite.

The antenna 110 can receive the GPS, Galileo and GLONASS signals. We let the frequency of the GPS or Galileo signal be denoted by $f_{rf1}$, and that of the GLONASS signal by $f_{rf2}$.

The low noise amplification circuit 120 is an LNA (Low Noise Amplifier) designed to amplify the signal received by the antenna 110 with low noise. This reception signal amplified by the low noise amplification circuit 120 with low noise is supplied to the first mixer 131.

The oscillator 170 generates a signal at a constant oscillation frequency. A crystal oscillator such as TCXO (Temperature Compensated Crystal Oscillator) is used as the oscillator 170, for example. The oscillator 170 generates a reference clock.

The PLL 181 is a PLL (Phase-Locked Loop) circuit designed to oscillate in synchronism with a frequency obtained by multiplying a frequency $f_{ref}$ of the reference clock. The PLL 181 uses a ring oscillator to generate output signals that are 90 degrees apart in phase. The output signals of the PLL 181 are supplied not only to the first mixer 131 as a first local oscillation signal but also to the frequency divider 182 to generate a second local oscillation signal.

The first mixer 131 mixes the output signal of the low noise amplification circuit 120 and the first local oscillation signal, thus converting the carrier frequency of the output signal of the low noise amplification circuit 120 into a lower first intermediate frequency. Letting the reference clock frequency be denoted by $f_{ref}$ and a multiplication factor of the PLL 181 by $N_1$, a frequency $f_{lo1}$ of the first local oscillation signal is expressed by $f_{ref}\times N_1$. Further, the first mixer 131 separates the reception signal into an I-channel (in-phase component) signal and a Q-channel (quadrature-phase component) signal based on the output signal of the PLL 181. It should be noted that the same mixer 131 is an example of a first mixer as defined in the appended claims.

The frequency divider 182 divides the frequency of the output signal of the PLL 181. The output signal of the frequency divider 182 is supplied to the second mixer 132 as the second local oscillation signal. It should be noted that the frequency divider 182 is an example of a first frequency divider as defined in the appended claims.

The second mixer 132 mixes the output signal of the first mixer 131 and the second local oscillation signal, thus converting the carrier frequency of the output signal of the first mixer 131 into an even lower second intermediate frequency.

Letting a frequency division ratio of the frequency divider 182 be denoted by $N_2$, a frequency $f_{lo2}$ of the second local oscillation signal supplied to the second mixer 132 is expressed by $f_{ref} \times N_1/N_2$. It should be noted that the second mixer 132 is an example of a second mixer as defined in the appended claims.

The amplifiers 141 to 144 amplify the reception signal. The amplifier 141 amplifies the I-channel signal at the first intermediate frequency. The amplifier 142 amplifies the Q-channel signal at the first intermediate frequency. The amplifier 143 amplifies the I-channel signal at the second intermediate frequency. The amplifier 144 amplifies the Q-channel signal at the second intermediate frequency.

The analog-digital converters 151 to 154 respectively convert the analog output signals of the amplifiers 141 to 144 into digital signals. The digital output signals of the same converters 151 to 154 are respectively connected to terminals 161 to 164 and supplied to the signal processing section 30.

[Frequency Distribution]

Figure 2:
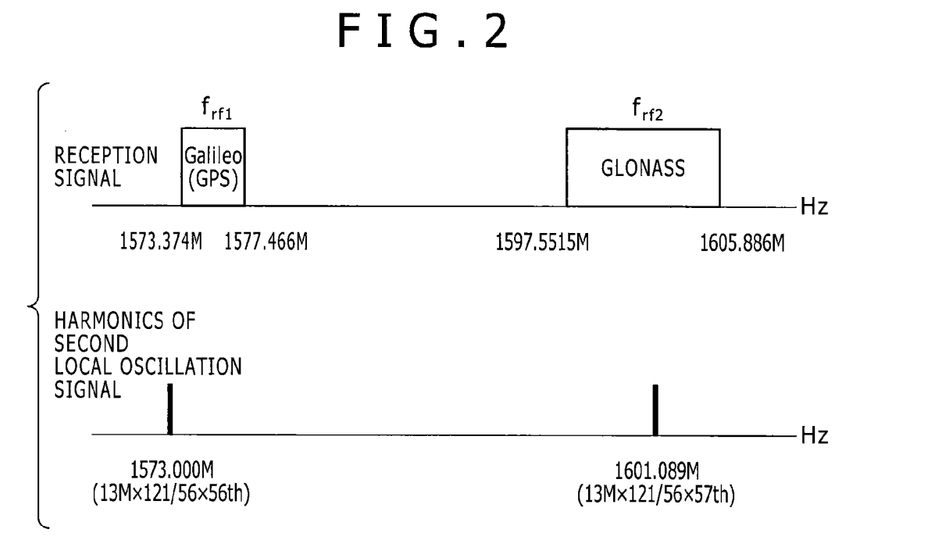
FIG. 2 is a diagram illustrating frequency distributions of second local oscillation signal harmonics and satellite signal carriers near 1.6 GHz in the first embodiment of the present technology.

FIG. 2 is a diagram illustrating frequency distributions of second local oscillation signal harmonics and satellite signal carriers near 1.6 GHz in the first embodiment of the present technology.

The center frequency of a carrier in an L1 frequency band of the GPS signal is 1575.420 MHz, and a chip rate of a C/A (Coarse/Acquisition) code is 1.023 MHz (GLOBAL POSITIONING SYSTEM WING (GPSW) SYSTEMS ENGINEERING & INTEGRATION, INTERFACE SPECIFICATION, IS-GPS-200E, June 2010). The center frequency of a carrier in an E1 frequency band of the Galileo signal is also 1575.420 MHz, and a chip rate is 2.064 MHz (European GNSS (Galileo) Open Service, Signal In Space Interface Control Document, February 2010). That is, the frequency band of the GPS signal in the L1 frequency band is included in that of the Galileo signal in the E1 frequency band. Therefore, the carrier frequency $f_{rf1}$ of the GPS or Galileo signal is from 1573.374 to 1577.466 MHz.

Carriers of the GLONASS signal are assigned to 14 channels from 1598.0625 to 1605.375 MHz. Considering a split frequency of 0.511 MHz, the carrier frequency $f_{rf2}$ of the GLONASS signal is from 1597.5515 to 1605.886 MHz (GLOBAL NAVIGATION SATELLITE SYSTEM GLONASS INTERFACE CONTROL DOCUMENT, Navigational Radiosignal In Bands L1, L2, Edition 5.1, 2008).

Here, if the reference clock frequency $f_{ref}$ is 13 MHz, and if the multiplication factor $N_1$ of the PLL 181 is 121, the frequency $f_{lo1}$ of the first local oscillation signal is 1573.000 MHz. Further, if the frequency division ratio $N_2$ of the frequency divider 182 is 56, the frequency $f_{lo2}$ of the second local oscillation signal is 28.08929 MHz. The frequency of the 56th harmonic of the second local oscillation signal is 1573.000 MHz, and that of the 57th harmonic is 1601.089 MHz. That is, the frequency of the 56th harmonic of the second local oscillation signal falls outside the band of the carrier frequency $f_{rf1}$ of the GPS or Galileo signal, and the frequency of the 57th harmonic thereof falls within the band of the carrier frequency $f_{rf2}$ of the GLONASS signal.

As described above, in the first embodiment, the first local oscillation signal frequency $f_{lo1}$ is generated by multiplying the reference clock frequency $f_{ref}$ by the multiplication factor $N_1$ in such a manner that the first intermediate frequency of the GPS or Galileo signal is set to a low or zero frequency. At this time, the first local oscillation signal frequency $f_{lo1}$ is set lower than the lower limit (1573.374 MHz) of the carrier frequency band of the Galileo signal. The second local oscillation signal frequency $f_{lo2}$ is generated by setting the frequency division ratio $N_2$ in such a manner that, of the harmonics of the second local oscillation signal frequency $f_{lo2}$, the harmonic component one higher in order than that equal to the frequency $f_{lo1}$ falls within the band of the frequency $f_{rf2}$ of the GLONASS signal.

A harmonic frequency $f_X$ of the second local oscillation signal frequency $f_{lo2}$ is expressed by the equation shown below where $N_X$ is the order of the harmonic frequency $f_X$.

$$f_X = f_{ref} \times N_1 \times N_2 \times N_X$$

Here, $N_X$ is the maximum number of the natural number N that satisfies the inequality shown below.

$$f_{ref} \times N_1/N_2 \times N < 1573.374 \text{ MHz}$$

As described above, the frequency of the $(N_X+1)$th harmonic falls within the band of the frequency $f_{rf2}$ of the GLONASS signal. This is expressed by the following inequality.

$$1597.5515 \text{ MHz} \leq f_{ref} \times N_1/N_2 \times (N_X+1) < 1605.886 \text{ MHz}$$

However, this harmonic is down-converted by the first and second mixers 131 and 132 so that $N_X = N_2$. As a result, the following equation holds.

$$f_{ref} \times N_1/N_2 \times (N_X+1) - f_{ref} \times N_1 - f_{ref} \times N_1/N_2 = 0 \text{ Hz}$$

That is, the harmonic that coincides with the band of the frequency $f_{rf2}$ of the GLONASS signal appears as a DC voltage shift or DC offset. This offset will not degrade the receiver performance because it can be readily removed by a DC removal filter as will be described later.

If the receiver is set up as described above, the GLONASS signal is similarly down-converted by the first and second mixers 131 and 132. The intermediate frequency of the output of the second mixer 132 is expressed by the following formula.

$$f_{rf2} - f_{ref} \times N_1/N_2 \times (N_X+1)$$

That is, the GLONASS signal can be output with approximately zero intermediate frequency. This makes it possible to keep the post-conversion power consumption of the amplifiers 143 and 144 and analog-digital converters 153 and 154 to a minimum, thus providing a low-power-consuming circuit free from degradation of the reception capability due to harmonics.

[DC Removal Filter]

Figure 3:
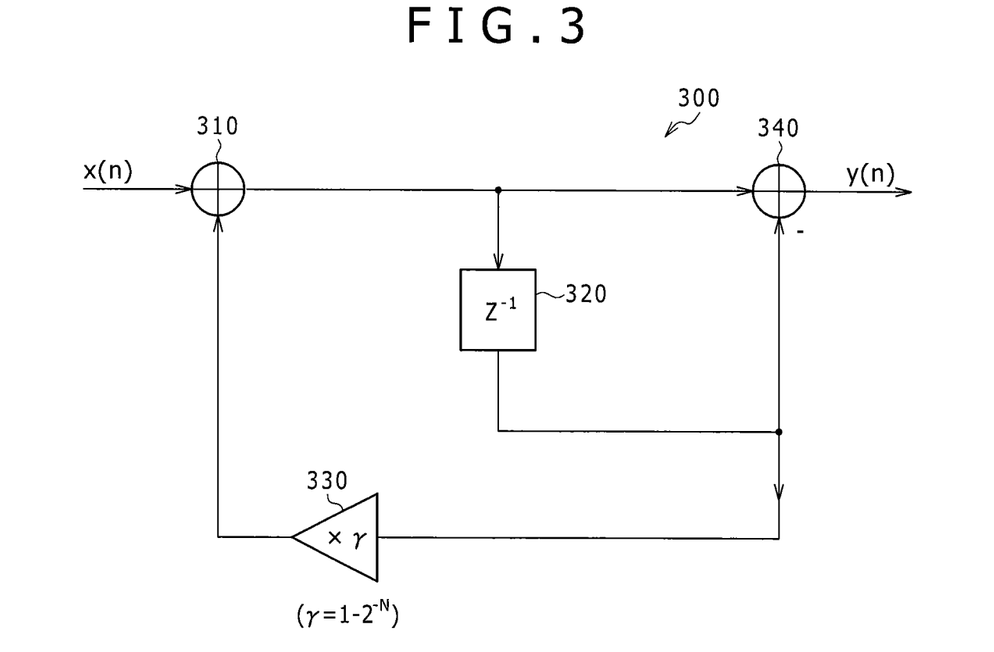
FIG. 3 is a diagram illustrating a configuration example of a notch filter, i.e., an example of a DC (Direct Current) removal filter in the embodiments of the present technology.

FIG. 3 is a diagram illustrating a configuration example of a notch filter 300, i.e., an example of the DC removal filter in the embodiments of the present technology. The notch filter 300 includes an adder 310, a delay element 320, a multiplier 330 and a subtractor 340.

The adder 310 adds an input signal of the notch filter 300 and an output signal of the multiplier 330. The delay element 320 delays an output signal of the adder 310 by one sampling period (one clock). The multiplier 330 is a linear filter having a fixed multiplication factor adapted to multiply an output signal of the delay element 320 γ-fold. The subtractor 340 subtracts the output signal of the delay element 320 from the output signal of the adder 310.

A transfer equation of the notch filter 300 is expressed by the following.

$$Y(z)/X(z) = (z-1)/(z-\gamma)$$

Figure 4:
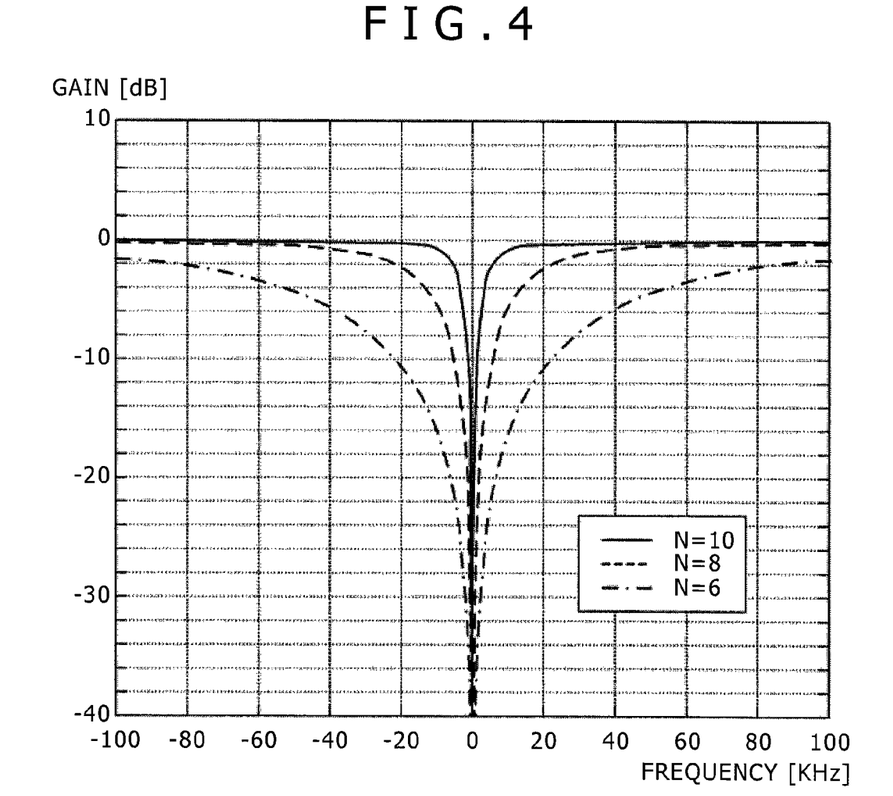
FIG. 4 is a diagram illustrating a frequency characteristic of the notch filter.

FIG. 4 is a diagram illustrating a frequency characteristic of the notch filter 300. In this diagram, the frequency range from 100 KHz below to 100 KHz above the frequency component of 0 Hz is shown. Here, three graphs are shown for $\gamma = 1 - 2^{-N}$ in which the order N is 6, 8 and 10. It is clear from this diagram that the notch filter 300 can sufficiently remove DC components.

In the embodiments of the present technology, the notch filter 300 is inserted somewhere in the GLONASS reception section 20. Alternatively, the notch filter 300 may be provided in the signal processing section 30.

As has been described so far, in the first embodiment, of the harmonic components of the second local oscillation signal, the harmonic component one higher in order than that equal to the first local oscillation signal frequency falls within the carrier frequency band of the GLONASS signal. This contributes to reduced power consumption of the receiver adapted to receive the GPS, Galileo and GLONASS signals while at the same time preventing adverse impacts of the harmonics on the reception capability.

2. Second Embodiment

In the first embodiment, of the harmonic components of the second local oscillation signal, the harmonic component one higher in order than that equal to the first local oscillation signal frequency falls within the carrier frequency band of the GLONASS signal. At this time, it has been shown that the harmonic component one higher in order appears as a DC offset. In a second embodiment, an approach will be investigated which specifies the frequencies at which the system clock is distributed to respective sections of the receiver.

[Configuration of Receiver]

Figure 5:
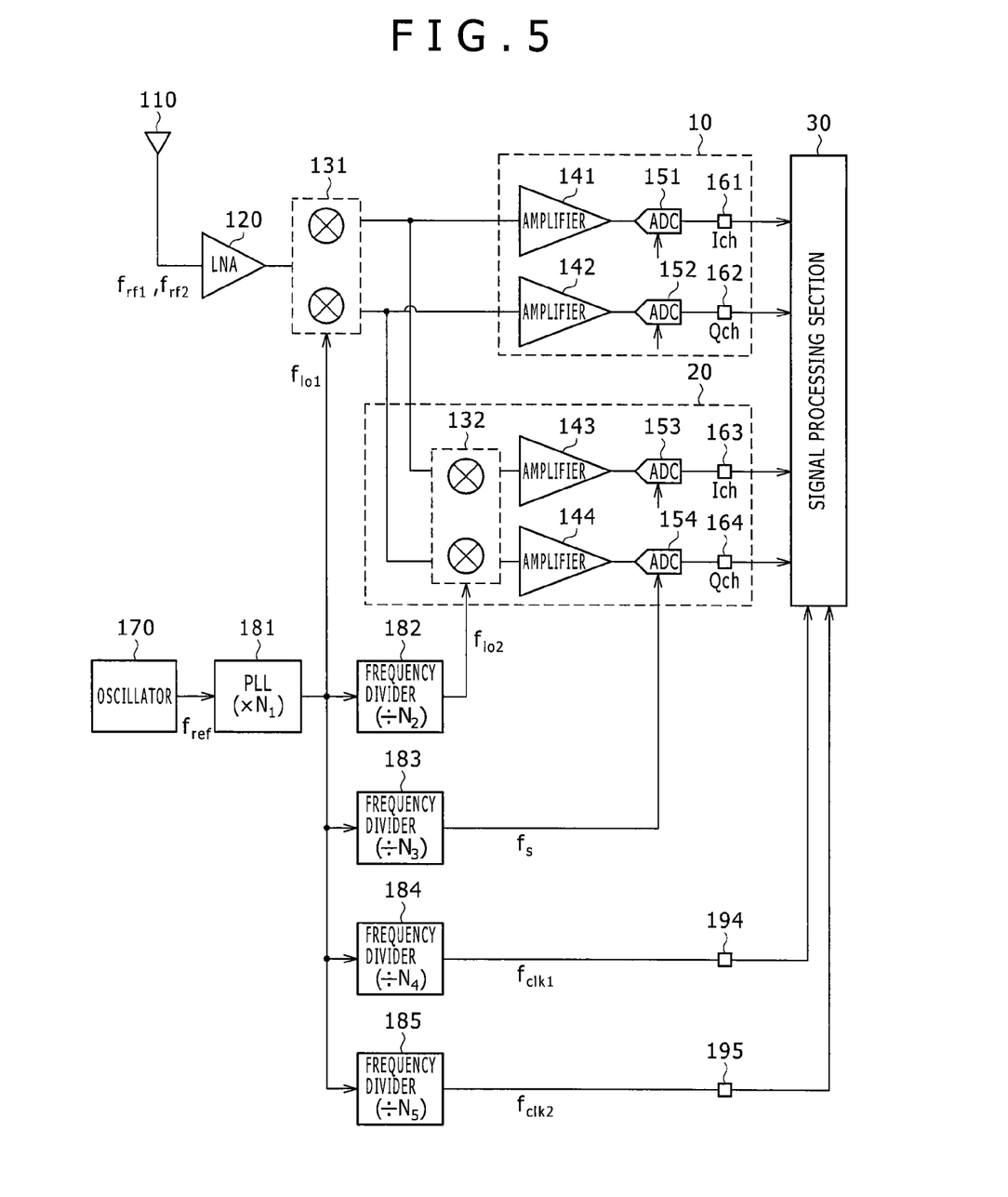
FIG. 5 is a diagram illustrating a configuration example of a receiver according to a second embodiment of the present technology.

FIG. 5 is a diagram illustrating a configuration example of the receiver according to the second embodiment of the present technology.

A sampling clock $f_s$ is necessary for the receiver to operate the analog-digital converters 151 and 152 in the GPS/Galileo reception section 10 and the analog-digital converters 153 and 154 in the GLONASS reception section 20. Further, a logic circuit operation clock $f_{clk1}$ is necessary to operate a baseband signal processing circuit or logic circuit including a processor in the signal processing section 30. Still further, a DC-DC converter operation clock $f_{clk2}$ is necessary which is supplied to a DC-DC converter adapted to convert a given DC voltage to an other DC voltage in the signal processing section 30.

Therefore, the receiver according to the second embodiment further includes frequency dividers 183, 184 and 185. The frequency divider 183 generates the sampling clock $f_s$. The frequency divider 184 generates the logic circuit operation clock $f_{clk1}$. The frequency divider 185 generates the DC-DC converter operation clock $f_{clk2}$. Except in this respect, the second embodiment is the same as the first embodiment. Therefore, a detailed description thereof is omitted. An output of the frequency divider 183 is supplied to the analog-digital converters 151 to 154. Outputs of the frequency dividers 184 and 185 are connected respectively to terminals 194 and 195 and supplied to the signal processing section 30. It should be noted that each of the frequency dividers 183 to 185 is an example of a second frequency divider as defined in the appended claims.

The frequencies of the system clocks generated by the frequency dividers 183 to 185 are set in such a manner that their harmonics do not coincide with any of the GPS, Galileo and GLONASS signals. That is, the frequency division ratios of the frequency dividers 183 to 185 are set in such a manner that the system clock frequencies fall outside the bands of their carrier frequencies.

[Frequency Distribution]

Figure 6:
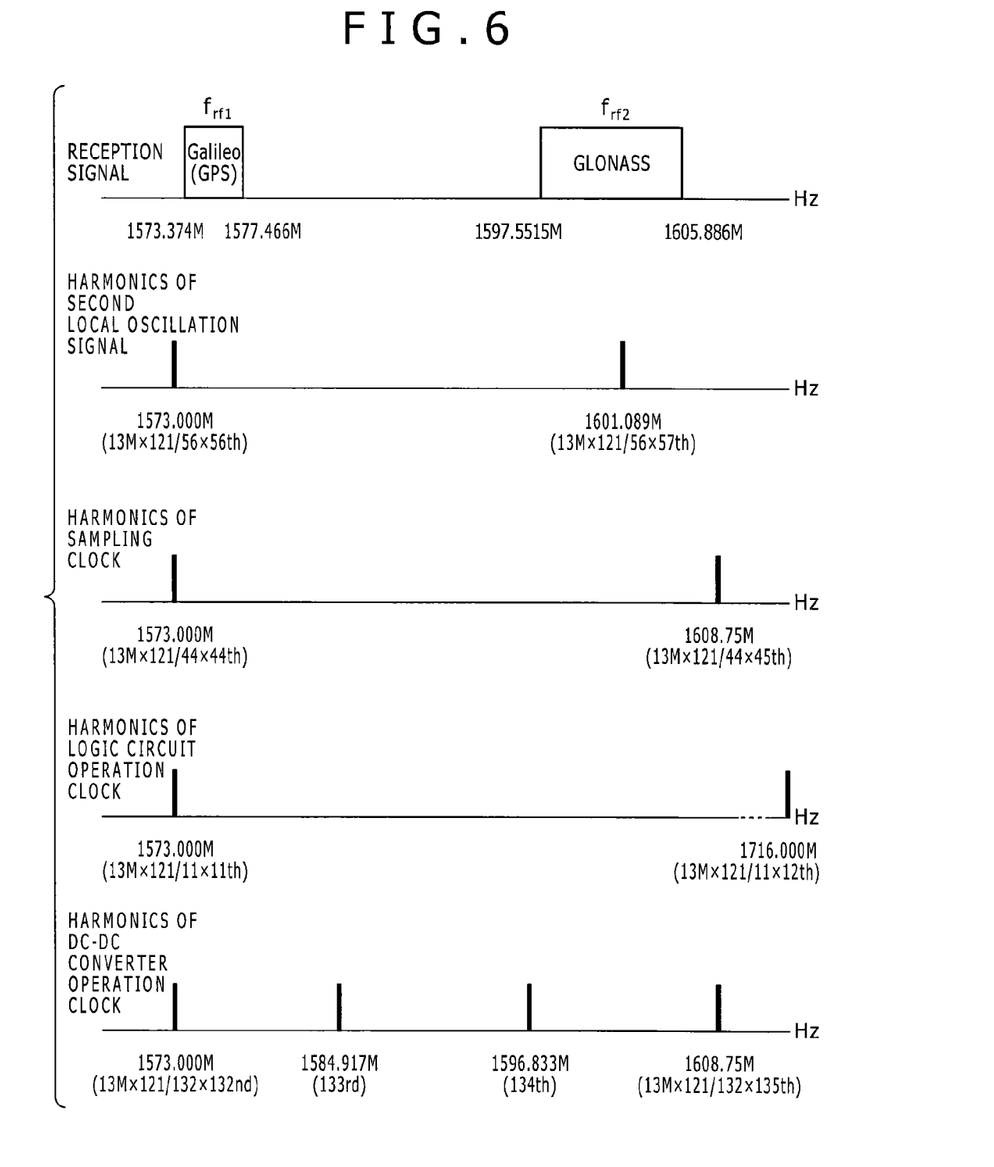
FIG. 6 is a diagram illustrating a first example of frequency distributions of respective signal harmonics and satellite signal carriers near 1.6 GHz in the second embodiment of the present technology.

FIG. 6 is a diagram illustrating a first example of frequency distributions of respective signal harmonics and satellite signal carriers near 1.6 GHz in the second embodiment of the present technology. The carriers of the GPS, Galileo and GLONASS signals are the same as those described with reference to FIG. 2.

The same values are used for the harmonics of the second local oscillation signal as those used in FIG. 2. That is, the reference clock frequency $f_{ref}$ is 13 MHz, the multiplication factor $N_1$ of the PLL 181 is 121, and the frequency division ratio $N_2$ of the frequency divider 182 is 56, thus providing 28.08929 MHz as the second local oscillation signal frequency $f_{lo2}$. Further, the frequency of the 56th harmonic of the second local oscillation signal is 1573.000 MHz, and the frequency of the 57th harmonic is 1601.089 MHz.

If a frequency division ratio $N_3$ of the frequency divider 183 is 44, the frequency of the sampling clock $f_s$ is 35.750 MHz. Further, the frequency of the 44th harmonic of the sampling clock $f_s$ is 1573.000 MHz. The frequency of the 45th harmonic of the sampling clock $f_s$ is 1608.750 MHz. It is clear that these harmonics do not coincide with any of the GPS, Galileo and GLONASS signals.

If a frequency division ratio $N_4$ of the frequency divider 184 is 11, the frequency of the logic circuit operation clock $f_{clk1}$ is 143.000 MHz. Further, the frequency of the eleventh harmonic of the logic circuit operation clock $f_{clk1}$ is 1573.000 MHz. The frequency of the twelfth harmonic of the logic circuit operation clock $f_{clk1}$ is 1716.000 MHz. It is clear that these harmonics do not coincide with any of the GPS, Galileo and GLONASS signals.

If a frequency division ratio $N_5$ of the frequency divider 185 is 132, the frequency of the DC-DC converter operation clock $f_{clk2}$ is approximately 11.91667 MHz. Further, the frequency of the 132nd harmonic of the DC-DC converter operation clock $f_{clk2}$ is 1573.000 MHz. The frequency of the 133rd harmonic of the DC-DC converter operation clock $f_{clk2}$ is 1584.917 MHz, that of the 134th harmonic thereof is 1596.833 MHz, and that of the 135th harmonic thereof is 1608.750 MHz. It is clear that these harmonics do not coincide with any of the GPS, Galileo and GLONASS signals.

By setting the frequency division ratios of the frequency dividers 183 to 185 as described above, it is clear that the harmonics of each of the system clocks can be kept outside the carrier frequency bands of the GPS, Galileo and GLONASS signals.

It should be noted that although, in this example, the frequency division ratio $N_4$ of the frequency divider 184 is 11, the same ratio $N_4$ may be set to 22 or 44 in addition to the above. If the frequency division ratio $N_4$ is 22, the frequency of the 22nd harmonic of the logic circuit operation clock $f_{clk1}$ is 1573.000 MHz, and that of the 23rd harmonic thereof is 1644.500 MHz. If the frequency division ratio $N_4$ is 44, the frequency of the 44th harmonic of the logic circuit operation clock $f_{clk1}$ is 1573.000 MHz, and that of the 45th harmonic thereof is 1608.750 MHz. It is clear that, in both cases, the harmonics of the logic circuit operation clock $f_{clk1}$ do not coincide with any of the GPS, Galileo and GLONASS signals.

Figure 7:
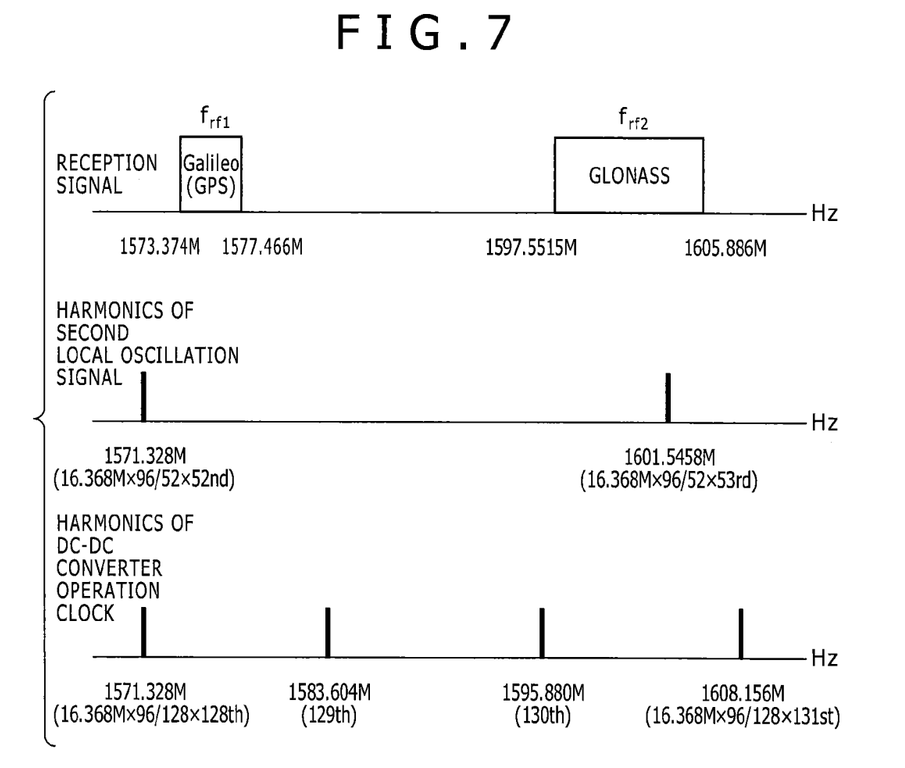
FIG. 7 is a diagram illustrating a second example of frequency distributions of respective signal harmonics and satellite signal carriers near 1.6 GHz in the second embodiment of the present technology.

FIG. 7 is a diagram illustrating a second example of frequency distributions of respective signal harmonics and satellite signal carriers near 1.6 GHz in the second embodiment of the present technology. The carriers of the GPS, Galileo and GLONASS signals are the same as those described with reference to FIG. 2.

In this example, the reference clock frequency $f_{ref}$ is 16.368 MHz, and the multiplication factor $N_1$ of the PLL 181 is 96. Therefore, the first local oscillation signal frequency is 1571.328 MHz.

If the frequency division ratio $N_2$ of the frequency divider 182 is 52, the second local oscillation signal frequency is approximately 30.2178 MHz. Further, the frequency of the 52nd harmonic of the second local oscillation signal is 1571.328 MHz. The frequency of the 53rd harmonic thereof is 1601.5458 MHz. That is, the frequency of the 52nd harmonic of the second local oscillation signal falls outside the band of the carrier frequency $f_{rf1}$ of the GPS or Galileo signal, and the frequency of the 53rd harmonic thereof falls within the band of the carrier frequency $f_{rf2}$ of the GLONASS signal. The 53rd harmonic appears as a DC offset as described in the first embodiment, thus keeping the reception capability free from degradation.

If the frequency division ratio $N_5$ of the frequency divider 185 is 128, the frequency of the DC-DC converter operation clock $f_{clk2}$ is 12.276 MHz. The frequency of the 128th harmonic of the DC-DC converter operation clock $f_{clk2}$ is 1571.328 MHz, that of the 129th harmonic thereof is 1583.604 MHz, that of the 130rd harmonic thereof is 1595.880 MHz, and that of the 131st harmonic thereof is 1608.156 MHz. It is clear that these harmonics do not coincide with any of the GPS, Galileo and GLONASS signals.

In each of the examples shown in the second embodiment, the GPS/Galileo reception section 10 can bring the final intermediate frequency down to a low frequency, and the GLONASS reception section 20 can bring the final intermediate frequency down to an approximately zero frequency. This keeps the power consumption of the amplifiers 141 to 144 and analog-digital converters 151 to 154 to a minimum.

As has been described so far, in the second embodiment of the present technology, the frequency components of the system clock harmonics are set in such a manner as to fall outside the carrier frequency bands of the GPS, Galileo and GLONASS signals. This contributes to reduced power consumption of the receiver adapted to receive the GPS, Galileo and GLONASS signals while at the same time preventing adverse impacts of the system clock harmonics on the reception capability.

It should be noted that the above embodiments are merely examples of implementing the present technology. There are correspondences between the features of the embodiments and the specific features of the technology defined in the appended claims. Similarly, there are correspondences between the specific features of the technology defined in the appended claims and the identically named features of the embodiments of the present technology. It should be noted, however, that the present technology is not limited to the embodiments but may be implemented by modifying the embodiments in various manners without departing from the scope of the present technology.

It should be noted that the present technology may have the following configurations.

(1) A receiver including:
a first mixer adapted to mix satellite signals from first and second satellites and a first local oscillation signal so as to convert a carrier frequency of the satellite signals into a lower first intermediate frequency;
a second mixer adapted to mix a satellite signal of the second satellite frequency-converted by the first mixer and a second local oscillation signal so as to convert the first intermediate frequency of the frequency-converted satellite signal from the second satellite into an even lower second intermediate frequency; and
a first frequency divider adapted to generate the second local oscillation signal by dividing a frequency of the first local oscillation signal in such a manner that, of harmonic components of the second local oscillation signal, a harmonic component one higher in order than that equal to the first local oscillation signal frequency falls within a carrier frequency band of the satellite signal from the second satellite.

(2) The receiver of feature (1), in which
the first frequency divider has a frequency division ratio identical to the order of the harmonic component, of the harmonic components of the second local oscillation signal, that is equal in frequency to the first local oscillation signal.

(3) The receiver of feature (1) or (2) further including
a filter adapted to remove DC components from the satellite signal from the second satellite that has been converted into the second intermediate frequency.

(4) The receiver of any one of features (1) to (3), in which
the first satellite is a GPS or Galileo satellite, and the second satellite is a GLONASS satellite.

(5) The receiver of any one of features (1) to (4), in which
a carrier frequency band of the first satellite is from 1573.374 to 1577.466 MHz, and that of the second satellite is from 1597.5515 to 1605.886 MHz.

(6) The receiver of feature (5), in which the first local oscillation signal frequency is 1573.000 MHz, and the frequency division ratio of the first frequency divider is 56.

(7) The receiver of feature (5), in which
the first local oscillation signal frequency is 1571.328 MHz, and the frequency division ratio of the first frequency divider is 52.

(8) The receiver of feature (1) further including
a second frequency divider adapted to generate a system clock by dividing the first local oscillation signal frequency in such a manner that a harmonic component of the system clock falls outside carrier frequency bands of the satellite signals of the first and second satellites.

(9) The receiver of feature (8), in which
the system clock is supplied to at least one of a baseband signal processing circuit or a logic circuit including a processor, an analog-digital converter adapted to convert an analog signal into a digital signal, and a converter adapted to convert a given DC voltage into an other DC voltage.

(10) The receiver of feature (9), in which
the first satellite is a GPS or Galileo satellite, and the second satellite is a GLONASS satellite.

(11) The receiver of feature (9) or (10), in which
the carrier frequency band of the first satellite is from 1573.374 to 1577.466 MHz, and that of the second satellite is from 1597.5515 to 1605.886 MHz.

(12) The receiver of any one of features (9) to (11), in which
the first local oscillation signal frequency is 1573.000 MHz,
a frequency division ratio of the first frequency divider is 56, and
a frequency division ratio of the second frequency divider adapted to generate the system clock supplied to the logic circuit is 11, 22 or 44, that adapted to generate the system clock supplied to the analog-digital converter is 44, and that adapted to generate the system clock supplied to the converter that converts a given DC voltage into an other DC voltage is 132.

(13) The receiver of any one of features (9) to (11), in which
the first local oscillation signal frequency is 1571.328 MHz,
a frequency division ratio of the first frequency divider is 52, and
a frequency division ratio of the second frequency divider adapted to generate the system clock supplied to the converter that converts a given DC voltage into an other DC voltage is 128.

(14) A receiver including:
a first mixer adapted to mix satellite signals from first and second satellites and a first local oscillation signal so as to convert a carrier frequency of the satellite signals into a lower first intermediate frequency;
a second mixer adapted to mix a satellite signal of the second satellite frequency-converted by the first mixer and a second local oscillation signal so as to convert the first intermediate frequency of the frequency-converted satellite signal from the second satellite into an even lower second intermediate frequency; and
a first frequency divider adapted to generate the second local oscillation signal by dividing a frequency of the first local oscillation signal, in which
letting the first local oscillation signal frequency be denoted by $f_{lo1}$ and a frequency division ratio of the first frequency divider by $N_2$, an inequality 1597.5515 MHz<$f_{lo1}$/$N_2$×($N_X$+1)<1605.886 MHz is satisfied where $N_X$ is a maximum number of a natural number N that satisfies an inequality $f_{lo1}$/$N_2$×N<1573.374 MHz.

The present disclosure contains subject matter related to that disclosed in Japanese Priority Patent Application JP 2012-134335 filed in the Japan Patent Office on Jun. 14, 2012, the entire content of which is hereby incorporated by reference.

What is claimed is:
1. A receiver comprising:
a first mixer configured to mix a reception signal including respective satellite signals from first and second satellites and a first local oscillation signal so as to convert a carrier frequency of the respective satellite signals into a lower first intermediate frequency;
a second mixer configured to mix an output of the first mixer that corresponds to a satellite signal of the second satellite that has been frequency-converted by the first mixer and a second local oscillation signal so as to convert the first intermediate frequency of the frequency-converted satellite signal from the second satellite into an even lower second intermediate frequency;
a first frequency divider configured to generate the second local oscillation signal by dividing a frequency of the first local oscillation signal in such a manner that, of harmonic components of the second local oscillation signal, a harmonic component one higher in order than a harmonic component equal to the frequency of the first local oscillation signal falls within a carrier frequency band of the satellite signal from the second satellite; and
a signal processing circuit configured to receive an output of the first mixer that corresponds to a satellite signal of the first satellite and an output of the second mixer that corresponds to a satellite signal of the second satellite.
2. The receiver of claim 1, wherein
the first frequency divider has a frequency division ratio identical to the order of the harmonic component, of the harmonic components of the second local oscillation signal, that is equal in frequency to the first local oscillation signal.
3. The receiver of claim 1, further comprising
a filter configured to remove a direct-current component from the output of the second mixer that corresponds to the satellite signal from the second satellite that has been converted by the second mixer into the second intermediate frequency.
4. The receiver of claim 1, wherein
the first satellite is a GPS (Global Positioning System) or Galileo satellite, and
the second satellite is a GLONASS (GLObal NAvigation Satellite System) satellite.
5. The receiver of claim 1, wherein
a carrier frequency band of the first satellite is from 1573.374 to 1577.466 MHz, and
the carrier frequency band of the second satellite is from 1597.5515 to 1605.886 MHz.
6. The receiver of claim 5, wherein
the frequency of the first local oscillation signal is 1573.000 MHz, and
a frequency division ratio of the first frequency divider is 56.
7. The receiver of claim 5, wherein
the frequency of the first local oscillation signal is 1571.328 MHz, and
a frequency division ratio of the first frequency divider is 52.
8. The receiver of claim 1, further comprising
a second frequency divider configured to generate a system clock by dividing the frequency of the first local oscillation signal in such a manner that a harmonic component of the system clock falls outside carrier frequency bands of the satellite signals of the first and second satellites.
9. The receiver of claim 8, wherein
the system clock is supplied to at least one of a baseband signal processing circuit or a logic circuit including a processor, an analog-digital converter configured to convert an analog signal into a digital signal, and a converter configured to convert a given direct-current voltage into another direct-current voltage.
10. The receiver of claim 9, wherein
the first satellite is a GPS (Global Positioning System) or Galileo satellite, and
the second satellite is a GLONASS (GLObal NAvigation Satellite System) satellite.
11. The receiver of claim 9, wherein
the carrier frequency band of the first satellite is from 1573.374 to 1577.466 MHz, and
the carrier frequency band of the second satellite is from 1597.5515 to 1605.886 MHz.
12. The receiver of claim 11, wherein
the frequency of the first local oscillation signal is 1573.000 MHz,
a frequency division ratio of the first frequency divider is 56, and
a frequency division ratio of the second frequency divider configured to generate the system clock supplied to the logic circuit is 11, 22 or 44, the frequency division ratio configured to generate the system clock supplied to the analog-digital converter is 44, and the frequency division ratio configured to generate the system clock supplied to the converter that converts the given direct-current voltage into the another direct-current voltage is 132.
13. The receiver of claim 11, wherein
the frequency of the first local oscillation signal is 1571.328 MHz,
a frequency division ratio of the first frequency divider is 52, and
a frequency division ratio of the second frequency divider configured to generate the system clock supplied to the converter that converts the given direct-current voltage into the another direct-current voltage is 128.

14. The receiver of claim 1, wherein
the first mixer is configured to separate the respective satellite signals into respective I-channel signals and respective Q-channel components based on the first local oscillation signal.

15. A receiver comprising:
a first mixer configured to mix a reception signal including respective satellite signals from first and second satellites and a first local oscillation signal so as to convert a carrier frequency of the respective satellite signals into a lower first intermediate frequency;
a second mixer configured to mix an output of the first mixer that corresponds to a satellite signal of the second satellite that has been frequency-converted by the first mixer and a second local oscillation signal so as to convert the first intermediate frequency of the frequency-converted satellite signal from the second satellite into an even lower second intermediate frequency;
a first frequency divider configured to generate the second local oscillation signal by dividing a frequency of the first local oscillation signal; and
a signal processing circuit configured to receive an output of the first mixer that corresponds to a satellite signal of the first satellite and an output of the second mixer that corresponds to a satellite signal of the second satellite, wherein
letting the frequency of the first local oscillation signal be denoted by $f_{lo1}$ and a frequency division ratio of the first frequency divider by $N_2$, an inequality 1597.5515 MHz$<f_{lo1}/N_2 \times (N_X+1)<$1605.886 MHz is satisfied where $N_X$ is a maximum number of a natural number N that satisfies an inequality $f_{lo1}/N_2 \times N<$1573.374 MHz.

16. The receiver of claim 15, further comprising
a filter configured to remove a direct-current component from the output of the second mixer that corresponds to the satellite signal from the second satellite that has been converted by the second mixer into the second intermediate frequency.

17. The receiver of claim 15, wherein
the first satellite is a GPS (Global Positioning System) or Galileo satellite, and
the second satellite is a GLONASS (GLObal NAvigation Satellite System) satellite.

18. The receiver of claim 15, further comprising
a second frequency divider configured to generate a system clock by dividing the frequency of the first local oscillation signal in such a manner that a harmonic component of the system clock falls outside carrier frequency bands of the satellite signals of the first and second satellites.

19. The receiver of claim 18, wherein
the system clock is supplied to at least one of a baseband signal processing circuit or a logic circuit including a processor, an analog-digital converter configured to convert an analog signal into a digital signal, and a converter configured to convert a given direct-current voltage into another direct-current voltage.

20. The receiver of claim 19, wherein
the first satellite is a GPS (Global Positioning System) or Galileo satellite, and
the second satellite is a GLONASS (GLObal NAvigation Satellite System) satellite.

* * * * *